(12) United States Patent
Lee et al.

(10) Patent No.: US 10,233,987 B2
(45) Date of Patent: Mar. 19, 2019

(54) BALL SCREW-TYPE ELECTRO-MECHANICAL BRAKE

(71) Applicant: Hyundai Motor Company, Seoul (KR)

(72) Inventors: Joung Hee Lee, Suwon-si (KR); Jong Yun Jeong, Hwaseong-si (KR); Dong Yoon Hyun, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/495,465

(22) Filed: Apr. 24, 2017

(65) Prior Publication Data
US 2018/0163803 A1  Jun. 14, 2018

(30) Foreign Application Priority Data
Dec. 9, 2016  (KR) .................. 10-2016-0167995

(51) Int. Cl.
| | |
|---|---|
| *F16D 65/18* | (2006.01) |
| *F16D 55/226* | (2006.01) |
| *B60T 13/74* | (2006.01) |
| *F16D 121/24* | (2012.01) |
| *F16D 125/36* | (2012.01) |
| *F16D 125/40* | (2012.01) |
| *F16D 125/58* | (2012.01) |

(52) U.S. Cl.
CPC ............ *F16D 65/18* (2013.01); *B60T 13/741* (2013.01); *F16D 55/226* (2013.01); *F16D 65/183* (2013.01); *F16D 2121/24* (2013.01); *F16D 2125/36* (2013.01); *F16D 2125/40* (2013.01); *F16D 2125/585* (2013.01)

(58) Field of Classification Search
CPC .... F16D 65/18; F16D 55/226; F16D 2121/24; F16D 2125/36; F16D 2125/40; F16D 2125/585
USPC ...................... 188/72.8, 71.9, 71.4, 156, 162
See application file for complete search history.

(56) References Cited

U.S. PATENT DOCUMENTS

| | | | | |
|---|---|---|---|---|
| 4,860,859 | A * | 8/1989 | Yamatoh ................ | B60T 8/326 188/156 |
| 5,107,967 | A * | 4/1992 | Fujita ..................... | B60T 1/065 188/156 |
| 6,158,557 | A * | 12/2000 | Leitermann ............ | F16D 65/14 188/162 |

(Continued)

FOREIGN PATENT DOCUMENTS

WO    WO 2015/081191 A1    6/2015

*Primary Examiner* — Thomas J Williams
*Assistant Examiner* — Mariano Sy
(74) *Attorney, Agent, or Firm* — Morgan, Lewis & Bockius LLP

(57) ABSTRACT

An electromechanical brake (EMB) may include a nut member coupled to the piston and transferring an axial moving force to the piston; a screw coupled to the nut member and rotated to move the nut member in an axial direction; balls inserted between the nut member and the screw and transferring a rotational force of the screw to the nut member; a compression coil spring having one side mounted on the nut member; and a ball retainer mounted at the other side of the compression coil spring, wherein the ball retainer is disposed to be adjacent to a ball at a rearmost end portion among the balls inserted between the nut member and the screw, and pressurizes the compression coil spring while coming in contact with the balls during braking pressurization.

12 Claims, 10 Drawing Sheets

(56) References Cited

U.S. PATENT DOCUMENTS

| | | | | |
|---|---|---|---|---|
| 7,004,290 B2* | 2/2006 | Ohtsuki | ................ | B60T 8/3255 |
| | | | | 188/162 |
| 8,616,348 B2* | 12/2013 | Winkler | ................. | F16D 65/18 |
| | | | | 188/196 V |
| 8,671,789 B2* | 3/2014 | Osterlaenger | ....... | F16H 25/2233 |
| | | | | 188/72.8 |
| 9,340,194 B2* | 5/2016 | Giering | ................ | B60T 13/741 |
| 2012/0018262 A1* | 1/2012 | Winkler | ................. | F16D 65/18 |
| | | | | 188/106 F |
| 2012/0085139 A1* | 4/2012 | Osterlanger | ............ | F16D 65/18 |
| | | | | 72/362 |
| 2016/0033018 A1* | 2/2016 | Tashiro | .................. | F16D 65/18 |
| | | | | 74/424.81 |
| 2016/0186825 A1* | 6/2016 | Winkler | ................ | B60T 13/741 |
| | | | | 188/106 F |

* cited by examiner

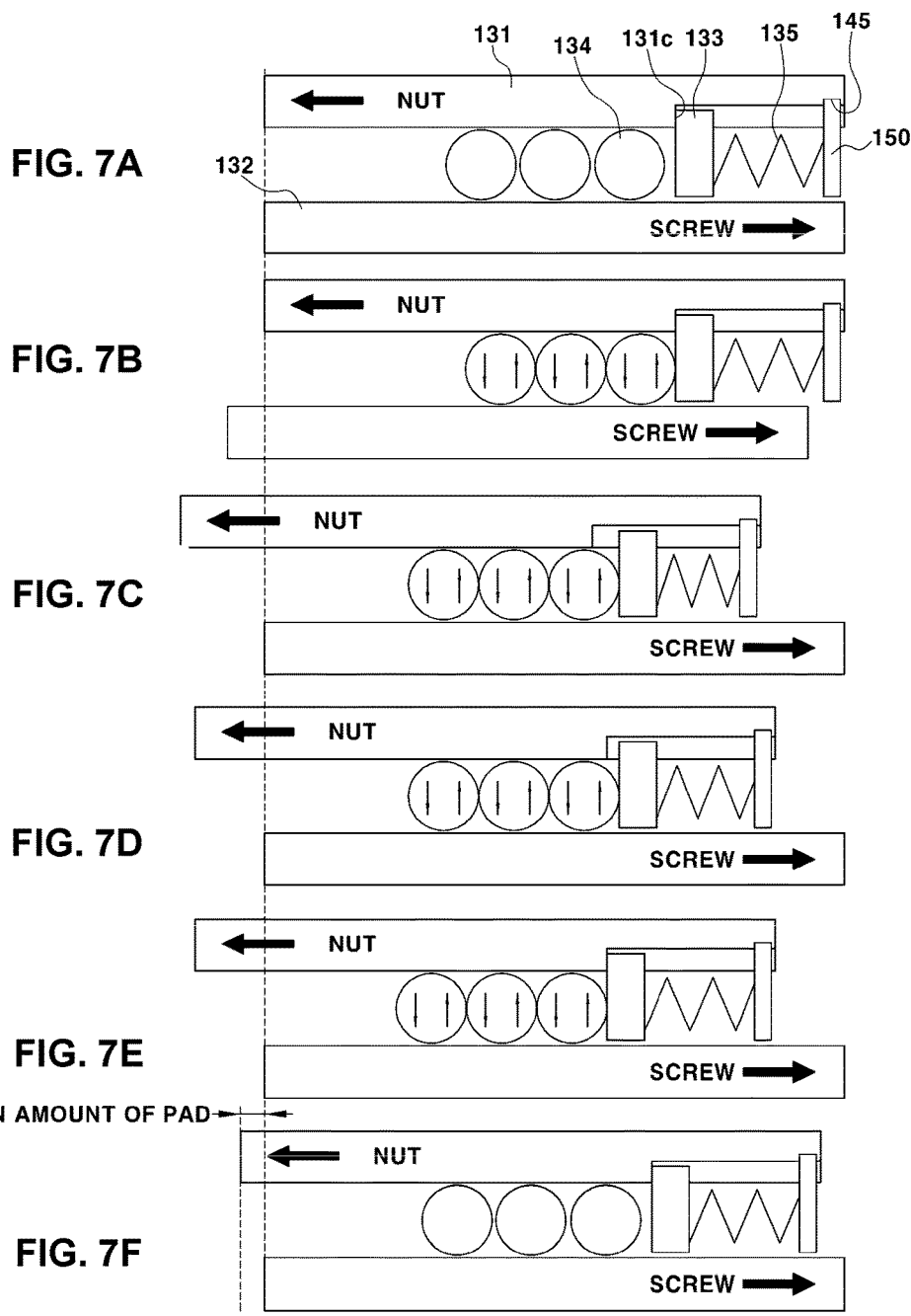

BALL SCREW-TYPE ELECTRO-MECHANICAL BRAKE

CROSS-REFERENCE TO RELATED APPLICATIONS

The present application claims priority to Korean Patent Application No. 10-2016-0167995 filed on Dec. 9, 2016, the entire contents of which are incorporated herein for all purposes by this reference.

BACKGROUND OF THE INVENTION

Field of the Invention

The present invention relates to an electro-mechanical brake (EMB). More particularly, it relates to an electro-mechanical brake (EMB) having a ball screw applied thereto.

Description of Related Art

In general, a brake device for a vehicle serves to generate a braking force for decelerating or stopping a vehicle in operation or maintaining the stationary state of the vehicle. When a vehicle is decelerated, the kinetic energy of the vehicle is converted into thermal energy by mechanical friction, and the frictional heat is discharged into the air such that the vehicle brakes.

Such a brake device for a vehicle may include a drum-type hydraulic brake and a disk-type hydraulic brake. Between the brakes, the disk-type hydraulic brake acquires a braking force by pressurizing both sides of a disk with frictional pads, the disk being rotated with a wheel instead of a drum.

However, since the hydraulic brake requires a mechanical element connected to the brake pedal of a driver seat, a hydraulic pipe and an element for controlling hydraulic pressure, the hydraulic brake has a complex structure. Therefore, to simplify the structure of the brake device, an electro-mechanical brake (EMB) has been developed and implemented.

The EMB refers to a brake that acquires a braking force by pressurizing a friction pad using a mechanical mechanism driven by an electric motor, unlike a general hydraulic brake.

A typical EMB has an actuator including an electric motor which is forward rotated to perform a braking operation (pressurizing friction pads) or backward rotated to release the braking operation (decompressing). During the braking operation, the typical EMB pressurizes the friction pads using the rotational force of the motor, such that the fiction pads pressurize a disk or rub against the disk.

Such an EMB has a simpler structure and higher response speed and can be controlled with more precision than the hydraulic brake. Thus, the braking stability can be improved.

The EMB can easily control a braking force, and is necessarily used to implement a brake by wire (BBW) system.

As described above, the EMB generates a braking force using electrical power generated by the motor and the mechanical transfer mechanism. At this time, most EMBs convert a rotational force of the motor into a linear force for pressurizing friction pads, using a screw-nut structure.

When such a screw-nut structure is constructed, a ball screw may be applied. The ball screw may include balls inserted between the nut and the screw, and can reduce frictional resistance while transferring a force through the balls.

The ball screw is divided into a circulation-type ball screw in which balls are circulated and a non-circulation-type ball screw in which balls are not circulated. The circulation-type ball screw can be applied when an operation section is long and continuous. The non-circulation-type ball screw is advantageous for a package because the external diameter of a nut can be reduced, but may be restrictively used when an operation section is short and discontinuous. In the EMB, the piston has a small amount of movement. Thus, the non-circulation-type ball screw may be applied to the EMB. In the EMB, however, the balls gradually move depending on pad abrasion. Thus, there is a demand for a technique for returning the balls to their original positions.

The information disclosed in this Background of the Invention section is only for enhancement of understanding of the background of the invention and should not be taken as an acknowledgement or any form of suggestion that this information forms the related art already known to a person skill in the art.

BRIEF SUMMARY

Various aspects of the present invention are directed to providing an EMB which includes a driving device implemented with a non-circulation-type ball screw, and can automatically compensate for a displacement in position of a ball due to pad abrasion.

An aspect of the present invention is directed to provide an EMB including a piston configured for pressurizing a friction pad and a driving device configured to provide power for moving the piston, in which the driving device includes: a nut member coupled to the piston and transferring an axial moving force to the piston; a screw coupled to the nut member and rotated to move the nut member in the axial direction; a plurality of balls inserted between the nut member and the screw and transferring a rotational force of the screw to the nut member; a compression coil spring having one side mounted on the nut member; and a ball retainer mounted at the other side of the compression coil spring, and the ball retainer is to be disposed adjacent to the ball at a rearmost end portion among the balls inserted between the nut member and the screw, and pressurizes the compression coil spring while coming in contact with the balls during braking pressurization.

In an exemplary embodiment, a head part may be formed at one end portion of the nut member to pressurize an internal end portion of the piston, and a support groove may be formed at the other end portion of the nut member to house the ball retainer and the compression coil spring.

In another exemplary embodiment, the support groove may have a support end portion for restricting the ball retainer from moving toward the ball.

In still another exemplary embodiment, the compression coil spring may be fixedly disposed on the support end portion in a compressed state to have an initial mounting force.

In yet another exemplary embodiment, the ball retainer may be disposed to have a gap with the ball before braking pressurization.

In still yet another exemplary embodiment, the ball retainer may form a gap from the ball even after braking is released.

In a further exemplary embodiment, the ball retainer may have a retainer groove formed in the internal surface thereof to house the balls.

In another further exemplary embodiment, the ball retainer may have one or more guide protrusions formed on the external circumferential surface thereof, and the nut member may have an axial groove to guide the axial movement of the guide protrusions.

In still another further exemplary embodiment, the nut member may have one or more guide protrusions formed on the internal surface thereof, and the ball retainer may have an axial groove formed on the external circumferential surface thereof wherein the axial groove guides the ball retainer in the axial direction along the guide protrusions.

In yet another further exemplary embodiment, the ball retainer may have a cylindrical shape to move in the axial direction along the internal surface of the nut member.

In still yet another further exemplary embodiment, the retainer groove may have an inwardly curved surface or an inclined surface with a predetermined slope.

In a still further exemplary embodiment, the nut member may have a guide groove through which the plurality of balls is moved, and the retainer groove may have the same internal diameter as the guide groove.

According to the exemplary embodiments of the present invention, since the EMB driven in a ball screw type can be implemented, frictional resistance can be reduced to improve the operation efficiency, and the durability of the driving device can be improved.

According to the exemplary embodiments of the present invention, since the non-circulation-type ball screw can be applied, the EMB can be reduced in size. Thus, the EMB has an advantage in terms of packaging.

Since the movement of the ball due to pad abrasion can be automatically compensated for, the EMB can be continuously used without separate pad abrasion compensation.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together server to explain certain principles of the present invention.

BRIEF DESCRIPTION OF THE DRAWINGS

FIG. 5A, FIG. 5B, FIG. 5C, and FIG. 5D are views illustrating a movement of a screw and nut, wherein FIG. 5A illustrates a state before contact with a ball retainer, FIG. 5B illustrates that braking pressurization is being performed, FIG. 5C illustrates a state in which pad abrasion occurs as the braking pressurizing is continued, and FIG. 5D illustrates a state after braking;

FIG. 6A, FIG. 6B, FIG. 6C, and FIG. 6D are views illustrating the motions of balls with respect to the ball retainer, wherein FIG. 6A illustrates a state before contact with the ball retainer, FIG. 6B illustrates that braking pressurization is being performed, FIG. 6C illustrates a state in which pad abrasion occurs as the braking pressurization is continued, and FIG. 6D illustrates a state after braking;

FIG. 7A, FIG. 7B, FIG. 7C, FIG. 7D, FIG. 7E, FIG. 7E, and FIG. 7F are views illustrating that the positions of the balls are adjusted while pad abrasion compensation is performed by the ball retainer, wherein FIG. 7A illustrates a state before contact with the ball retainer, FIG. 7B and FIG. 7C illustrate that braking pressurization is being performed, FIG. 7D illustrates that a spring is released during brake release, FIG. 7E illustrates that wear compensation is performed during brake release, and FIG. 7F illustrates that the balls are returned to the original positions after the brake release is completed;

Figure 1:
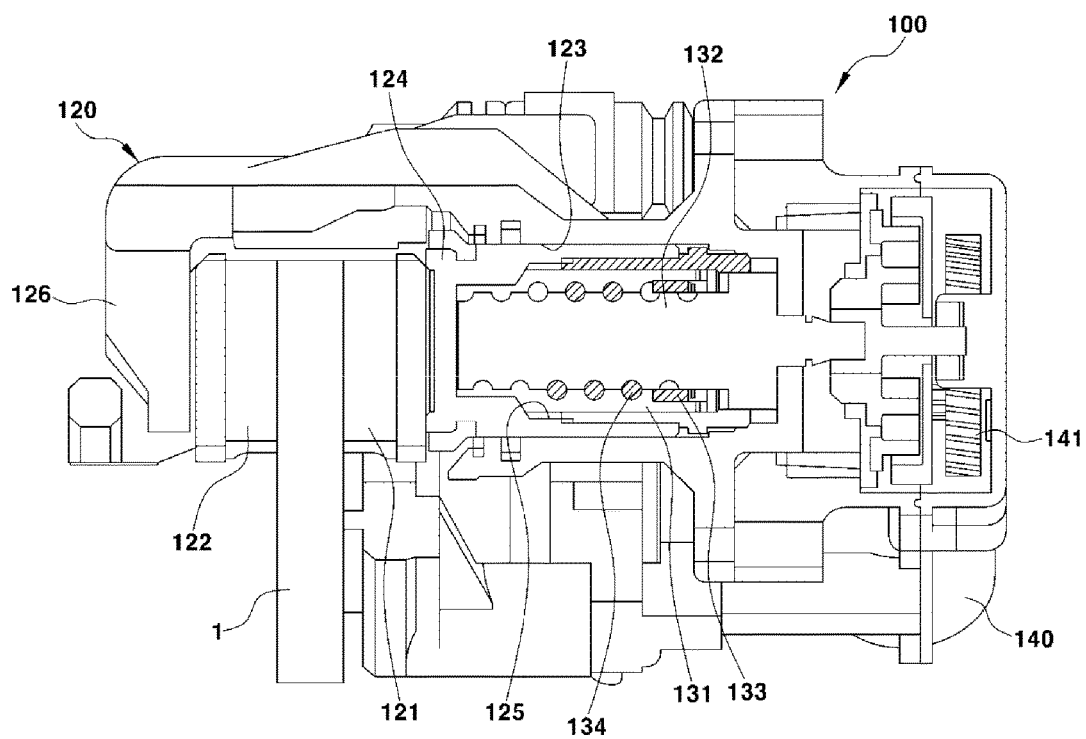
FIG. 1 is a cross-sectional view of an electro-mechanical brake (EMB) according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An electro-mechanical brake (EMB) according to an exemplary embodiment of the present invention has a feature that a driving device is implemented with a non-circulation-type ball screw, the driving device transferring a driving force of a motor while a clamping force of a caliper housing is applied when the motor is driven to generate a braking force. The EMB according to an exemplary embodiment of the present invention has another feature that, when the ball screw-type driving device is configured, the driving device is implemented in a non-circulation type, and a ball retainer is formed at one end portion of a nut to compensate for a ball position displacement caused by pad abrasion. The ball retainer may be disposed with an elastic member disposed in the direction of the pad abrasion, and compensate for the pad wear through the restoration force of the elastic member.

Hereafter, a ball screw-type EMB according to an exemplary embodiment of the present invention will be described in detail with reference to the accompanying drawings.

Figure 2:
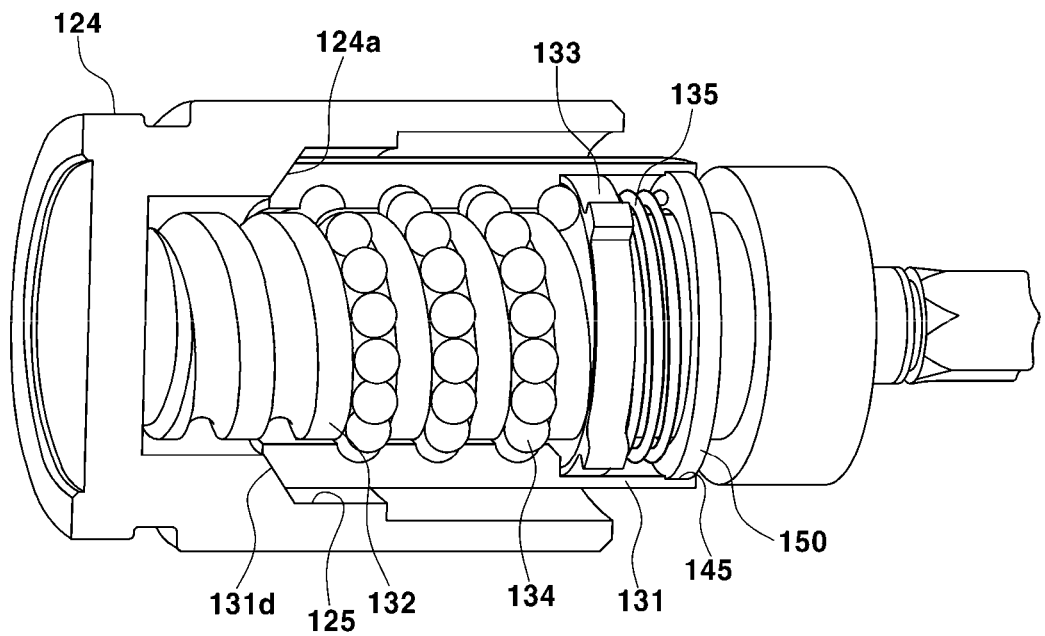
FIG. 2 is a cross-sectional perspective view illustrating main operating parts in the EMB according to an exemplary embodiment of the present invention.
Figure 3:
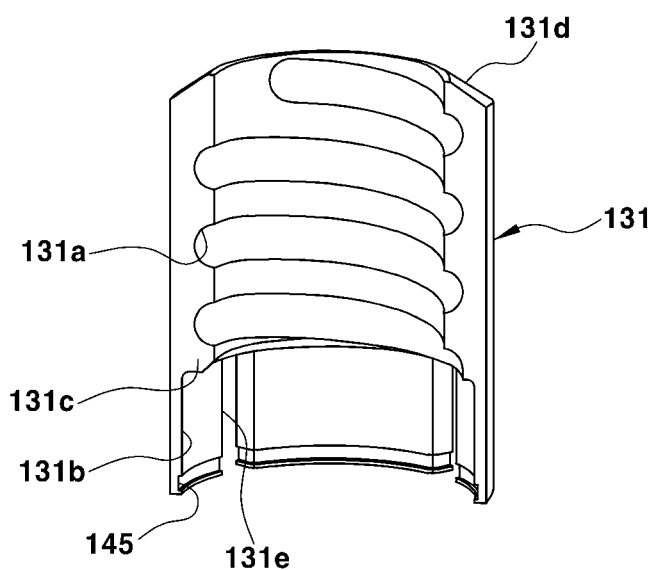
FIG. 3 is a cross-sectional perspective view of a nut among the main operating parts illustrated in FIG. 2.

FIG. 1 is a cross-sectional view of an EMB according to an exemplary embodiment of the present invention, and FIG. 2 is a cross-sectional perspective view of main operating parts in the EMB according to an exemplary embodiment of the present invention. FIG. 3 is a cross-sectional perspective view of a nut member among the main operating parts illustrated in FIG. 2. FIG. 4A, FIG. 4B, FIG. 4C, and FIG. 4D illustrate a ball retainer.

As illustrated in FIG. 1, the EMB 100 according to the exemplary embodiment of the present invention includes a carrier fixedly disposed on a vehicle body and a caliper housing 120 movably coupled to the carrier. The carrier and the caliper housing 120 are arranged in a shape to surround a disk 1 at one side thereof, the disk 1 being disposed in a wheel of the vehicle.

The carrier includes a pair of friction pads (brake pads) 121 and 122 movably disposed therein. The pair of friction pads 121 and 122 pressurizes both surfaces of the disk 1 which is rotated with the wheel of the vehicle.

The pair of friction pads 121 and 122 is separated apart from each other wherein the disk 1 is disposed therebetween. Thus, when the piston 124 described below is moved forward, the friction pad 121 is moved toward the disk 1 and pressurizes the disk 1 while rubbing against the disk 1, braking the vehicle.

The caliper housing 120 is slidably disposed in the carrier, and has a cylinder 123 in which a piston 124 is disposed.

That is, the hollow cylinder 123 is disposed at one side of the caliper housing 120, and the piston 124 can be moved forward and backwards in the cylinder 123.

The piston 124 is moved forward to move any one friction pad 121 between the pair of friction pads 121 and 122 forward toward the disk 1, wherein the friction pad 121 rubs against the disk 1.

At the other side of the caliper housing 120, a finger part 126 is formed. The finger part 126 moves the other friction pad 122 forward toward the disk 1 wherein the friction pad 122 rubs against the disk 1.

Thus, while moved forward toward the friction pad 121 and the disk 1 by a force transferred for braking, the piston 124 pressurizes one friction pad 121 against the disk 1. Furthermore, while the caliper housing 120 is moved in a direction opposite to the moving direction of the piston 124 by the reaction force applied between the piston 124 and the friction pad 121, the finger part 126 of the caliper housing 120 pressurizes the other friction pad 122 against the disk 1.

Then, the two friction pads 121 and 122 pressurize both surfaces of the disk 1 at the same time.

At the present time, braking is performed by the frictional force generated between the two friction pads 121 and 122 and the disk 1, and the frictional force generates a braking force to restrict the rotation of the wheel.

At the present time, the forces of the piston 124 and the finger part 126 of the caliper housing 120, which pressurize both surfaces of the disk 1 through the friction pads 121 and 122, may be referred to as a clamping force of the caliper housing 120. When braking is performed (that is, when the friction pads are pressurized), a reaction force caused by the clamping force is applied to the piston 124 from the friction pad 121.

The EMB 100 according to an exemplary embodiment of the present invention includes a driving device for operating the piston 124. The driving device includes a nut member 131 and a screw 132. The nut member 131 is coupled to the piston 124 disposed in the cylinder 123 of the caliper housing 120 and moves forward and backwards in the axial direction (linearly moved in the forward and backward direction) to move forward and backwards the piston 124, and the screw 132 is coupled to the nut member 131 and rotated to move forward and backwards the nut member 131 (linearly move the nut member 131 in the forward and backward direction). The driving device according to an exemplary embodiment of the present invention further includes an electric motor 140 and a gear assembly 141. The electric motor 140 provides a rotational force for generating a braking force, and the gear assembly 141 is disposed between the screw 132 and the rotation shaft of the electric motor 140, and transfers the rotational force of the electric motor 140 to the screw 132.

The electric motor 140 of the driving device is a driving source for generating a driving force for braking (pressurizing) and braking release (decompression), that is, a rotational force. The electric motor 140 is rotated in the forward direction when pressurizing the friction pads, and rotated in the backward direction when releasing the friction pads. The electric motor 140 generates a forward rotational force and a backward rotational force, and provides the forward rotational force and the backward rotational force to the screw 132 through the gear assembly 141.

The operation of the electric motor 140 is configured to be controlled by a controller, and the controller is configured to control the forward and backward rotations of the motor 140.

The screw 132 is coupled to the shaft of an output gear of the gear assembly 141, and the gear assembly 141 amplifies the rotational force of the motor 140 while lowering the rotation speed of the motor 140, and transmits the amplified rotational force to the screw 132. The gear assembly 141 may include a gear train having a plurality of gears combined therein.

The electric motor 140 and the gear assembly 141 may include an electric motor and a gear assembly which are already applied to a publicly known EMB 100.

In the present exemplary embodiment, the driving device is implemented with a ball screw-type driving device, and a plurality of balls 134 inserted between the screw 132 and the nut member 131 convert a rotational motion of the screw into a translation motion of the piston.

First, the piston 124 of the caliper housing 120 has a hollow portion 125 formed therein, the hollow portion 125 being extended along the axial direction which coincides with the forward and backward movement direction of the piston, and the nut member 131 is disposed and coupled in the hollow portion 125 of the piston 124.

As illustrated in FIG. 3, the nut member 131 has a long cylindrical shape, and includes a head part 131d formed at the leading end portion thereof. The head part 131d comes in contact with an internal end portion 124a of the hollow portion 125 of the piston 124 and pressurizes the internal end portion 124a of the hollow portion 125.

The nut member 131 has a spiral guide groove 131a formed along the internal circumferential surface thereof. The guide groove 131a is configured to guide the motions of balls between the screw 132 and the nut member 131, and has a length to control the motions of the balls in consideration of the number of balls included in the ball screw.

The nut member 131 is assembled to surround the external circumference of the screw 132, and moved along the external surface of the screw by the plurality of balls inserted between the external surface of the screw and the internal surface of the nut member 131. That is, when the screw is rotated by the operation of the electric motor, the nut member and the piston 124 connected to the nut member are linearly moved by the balls.

For the present structure, the screw also has a guide groove corresponding to the guide groove 131a of the nut member 131, and the plurality of balls are disposed therebetween.

According to the exemplary embodiment of the present invention, a cylindrical support groove 131b is formed at the other end portion of the nut member 131, that is, the end portion opposite to the one end portion at which the head part 131d is formed, and is configured to house and support the ball retainer 133. As illustrated in FIG. 2, the ball retainer 133 and a spring member 135 for elastically supporting the ball retainer 133 are inserted into the support groove 131b, and a support end portion 131c for restricting the ball retainer 133 is formed at one end portion of the support groove 131b.

As illustrated in FIG. 2 and FIG. 3, the ball retainer 133 has a ring shape to be inserted along the external circumference of the screw. The ball retainer 133 is elastically supported by the spring member 135. Desirably, the nut member 131 includes a groove 145 and an annular flange 150 fixed to the groove 145, wherein the spring member 135 is mounted on the annular flange 150. Accordingly, one end portion of the spring member 135 is fixed on the nut member 131 and the other end portion of the spring member 135 may be fixed to the ball retainer 133 as shown in FIG. 2. In the present exemplary embodiment, the spring member 135 is a compressible coil spring, and may not be fixed as long as it can be compressed and restored in the axial direction. However, the unfixed structure may cause a gap between the ball retainer and the spring or another component during the compression or restoration process of the spring. Since the gap can act negatively on the operation accuracy of the driving device, the spring member may be fixed to the ball retainer. Thus, when the spring member 135 according to the exemplary embodiment of the present invention receives an external force, the spring member 135 can be compressed in the axial direction of the screw, or restored according to a relative motion between the ball retainer and the nut.

Referring to FIG. 2, the ball retainer 133 is mounted on the nut member through the spring member 135. Thus, the ball retainer and the nut member are moved together. However, in a special case where a relative motion between the ball retainer 133 and the nut occurs, the spring member 135 is compressed to provide a restoring force to the balls. Therefore, the spring member 135 is configured to restore the balls to their original positions when braking is released.

The detailed structure of the ball retainer is illustrated in FIG. 4A to FIG. 4D. FIG. 4A, FIG. 4B, FIG. 4C, and FIG. 4D illustrate ball retainers according to different exemplary embodiments of the present invention.

Figure 4A:
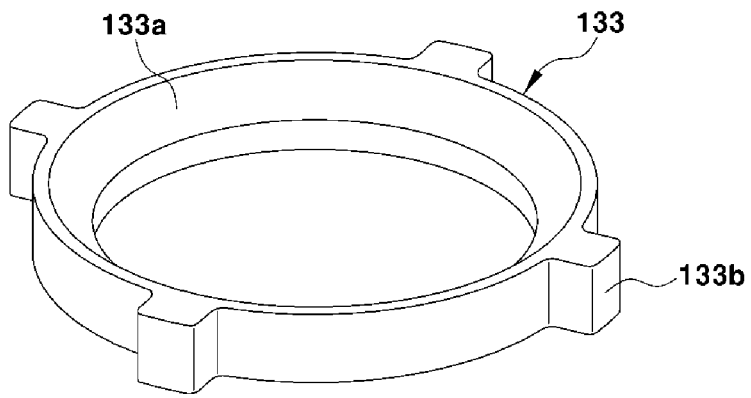
FIG. 4A, FIG. 4B, FIG. 4C, and FIG. 4D are perspective views illustrating an example of a ball retainer among the main operating parts illustrated in FIG. 2.
Figure 4B:
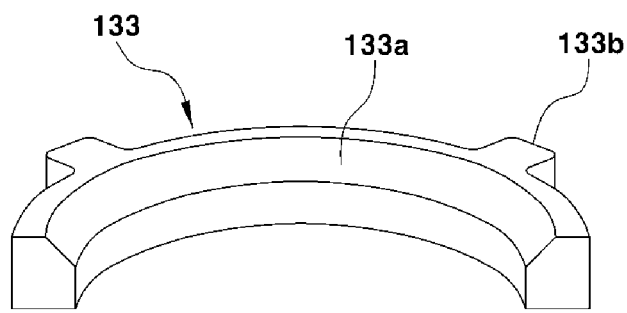

The ball retainer 133 has a retainer groove 133a formed therein, to transfer a force applied by the balls while supporting the balls. The retainer groove 133a may be formed at an end portion surface where the retainer faces the balls. As illustrated in FIG. 4A and FIG. 4B, the retainer groove 133a may be formed across the internal surface of the ball retainer. Moreover, as illustrated in FIG. 4A, the retainer groove 133a may be formed in an inwardly curved shape according to the shape of the balls. As illustrated in FIG. 4B, the retainer groove may have an inclined surface with a predetermined slope.

Therefore, the ball-side end portion of the retainer groove 133a may restrict the backward movement of the balls while naturally housing the balls moving toward the retainer, and the ball retainer compresses the spring member. For example, when the balls pressurize the ball retainer 133, the spring member 135 is compressed, and the ball retainer 133 is moved backwards (the right direction of FIG. 2).

The ball retainer 133 is positioned between the screw and the nut, and linearly driven in the axial direction of the screw. Therefore, as illustrated in FIG. 4A, the ball retainer 133 may have guide protrusions 133b for assisting the axial movement. Such guide protrusions 133b are formed along the external circumference of the ball retainer. Desirably, two or more guide protrusions 133b may be symmetrically formed to effectively assist the axial movement. For example, as illustrated in FIG. 4A, four guide protrusions 133b may be formed at equidistant intervals outside the ball retainer 133. In the present case, as illustrated in FIG. 3, the nut member 131 has grooves 131e formed thereon to correspond to the guide protrusions 133b of the ball retainer 133.

Figure 4C:
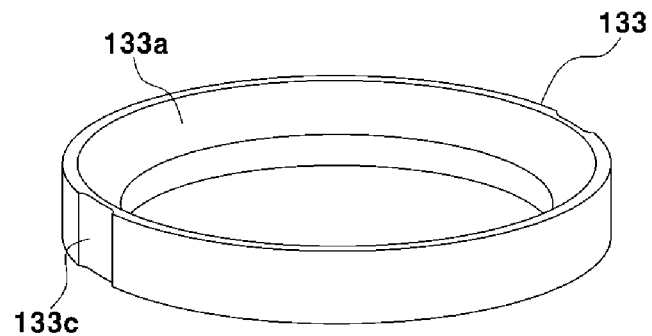

As illustrated in FIG. 4C, the ball retainer 133 may have grooves 133c formed on the external circumferential surface thereof, to assist the axial movement. In the present case, the nut member 131 may have guide protrusions formed on the internal surface thereof to extend along the axial direction. Such a structure is the same as the structure of FIG. 3 and FIG. 4A, except that the grooves and the protrusions are disposed at the opposite positions.

Figure 4D:
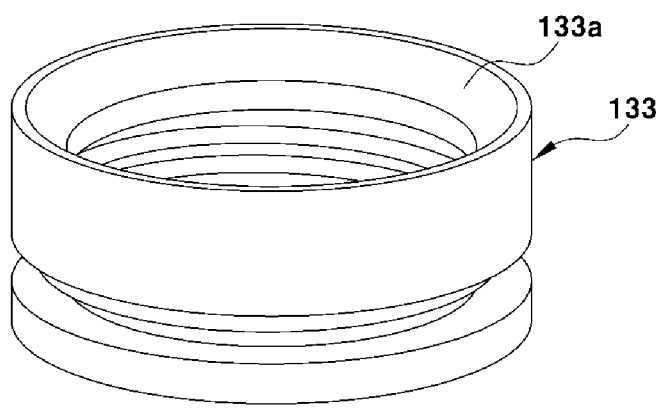

FIG. 4D illustrates another exemplary embodiment of the ball retainer. In the example of FIG. 4D, the ball retainer has a cylindrical shape in which the external circumference of the ball retainer 133 has a relatively large area like a band while the spring member is housed and supported in the ball retainer 133. In such an example, the ball retainer 133 does not have portions including grooves or protrusions for assisting the axial movement. Only the external circumferential surface of the ball retainer 133 is slid and moved along the internal surface of the nut member 131.

The retainer groove is configured to temporally house the balls of the ball screw. Desirably, the internal diameter of the retainer groove may correspond to the internal diameter of the guide groove 131a of the nut member.

As described below, the balls inserted into the ball screw are set to maintain a non-contact state with the ball retainer 133, based on the initial state. Therefore, while the ball at the rearmost end portion of the ball screw and the ball retainer 133 do not come in contact with each other, the translation motion of the nut is performed by the rotation of the screw. Through this operation, the balls can move the nut member 131 while maintaining the non-contact state. Thus, the efficiency of the driving device is improved. As illustrated in FIG. 2 and FIG. 3, the support end portion 131c may be formed at one end portion of the support groove 131b, and the spring member 135 may be compressed and supported by the support end portion 131c and thus have the initial mounting force. The initial mounting force indicates a force required to have the initial state in which the spring member is compressed. When the initial mounting force is applied to the spring member 135, the non-contact state between the ball and the ball retainer 133 can be maintained by the initial mounting force, even though braking is released.

FIG. 5A, FIG. 5B, FIG. 5C, and FIG. 5D illustrate movements of the screw and nut, and FIG. 6A, FIG. 6B, FIG. 6C, and FIG. 6D illustrate motions of the balls with respect to the ball retainer 133 in situations corresponding to FIG. 5A to FIG. 5D.

Figure 5A:
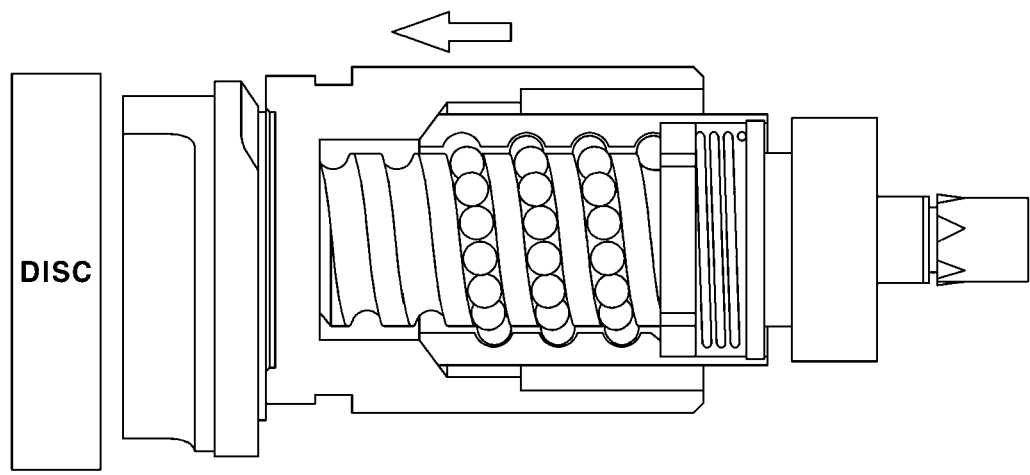
Figure 6A:
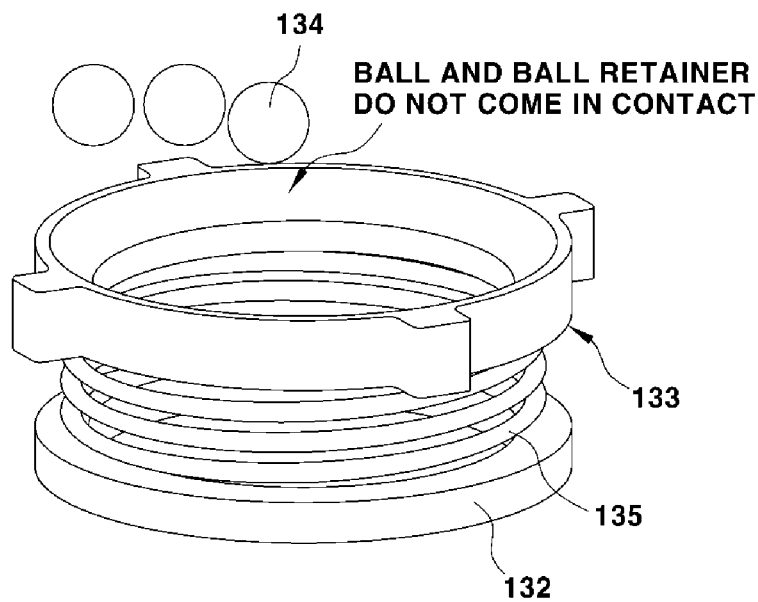

In the present exemplary embodiment, since the balls and the ball retainer 133 are initially set not to come in contact with each other, the balls and the ball retainer 133 do not come in contact with each other as illustrated in FIG. 6A at a point of time that the operation of the ball screw is started. In the present case, as illustrated in FIG. 5A, the disk and the friction pads do not come in contact with each other, and the nut member 131 starts to move forward thereof.

Figure 5B:
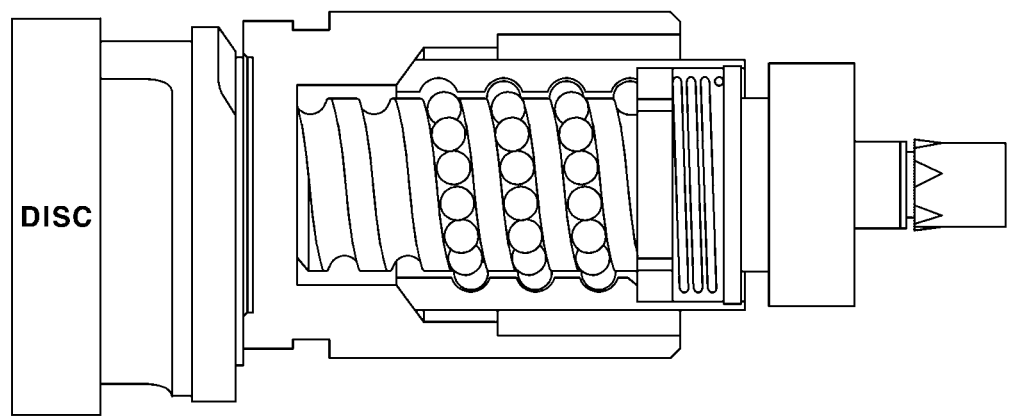
Figure 6B:
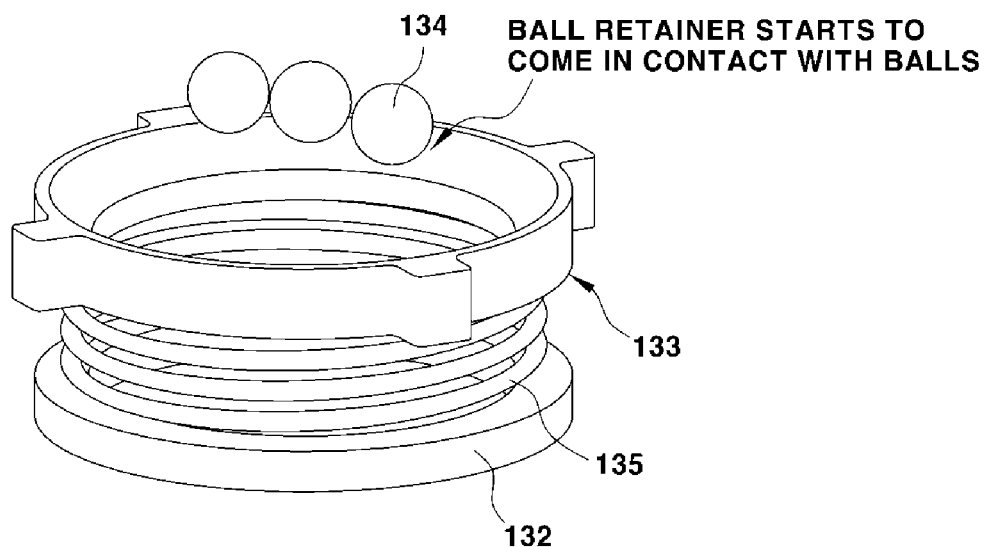
Figure 6C:
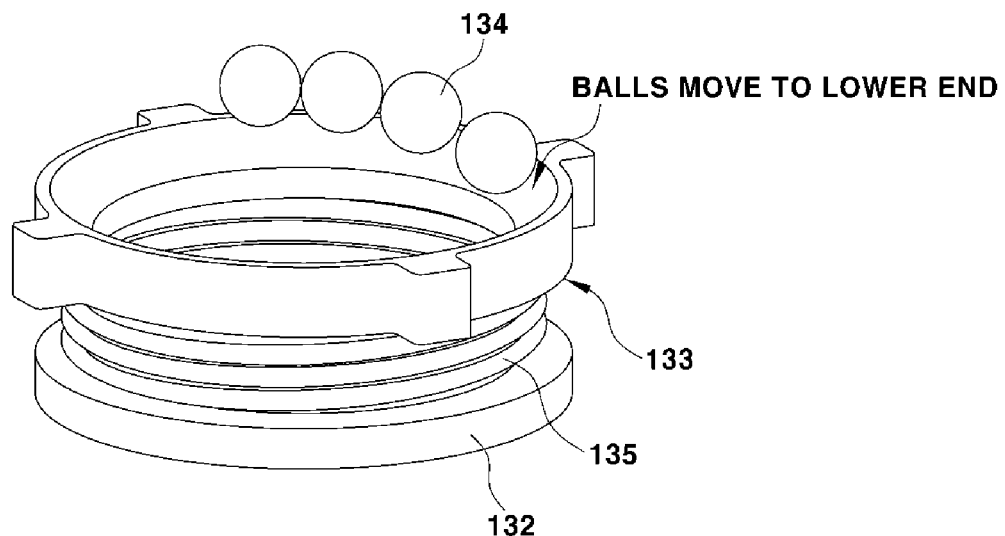
Figure 6D:
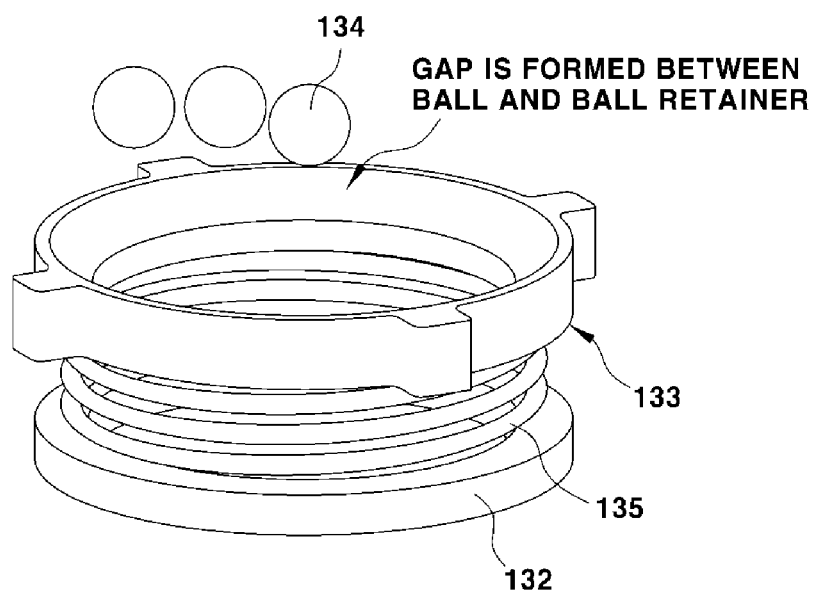

FIG. 5B illustrates that braking pressurization is being performed. During the braking pressurization, braking is performed while the disk and the friction pads come in contact with each other. During the braking pressurization, the balls start to come in contact with the ball retainer 133 while being moved backwards by a braking reaction force as illustrated in FIG. 6B.

Figure 5C:
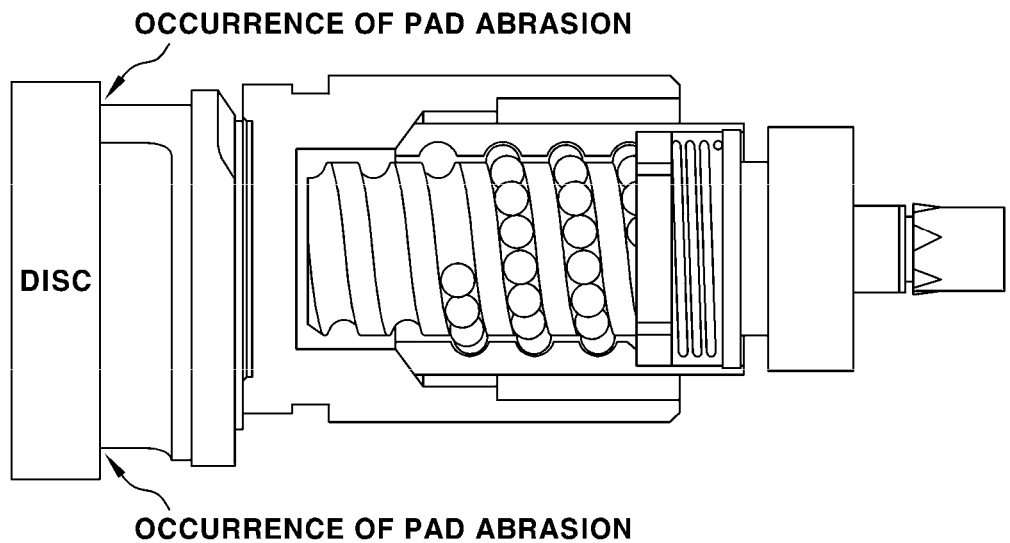

FIG. 5C illustrates a state in which pad abrasion occurs as the braking pressurization is continued. At the present time, the balls are moved backwards and completely moved to the retainer groove 133a of the ball retainer 133 as illustrated in FIG. 5C. Then, the balls compress the spring member while pressurizing the retainer groove 133a of the ball retainer 133.

Figure 5D:
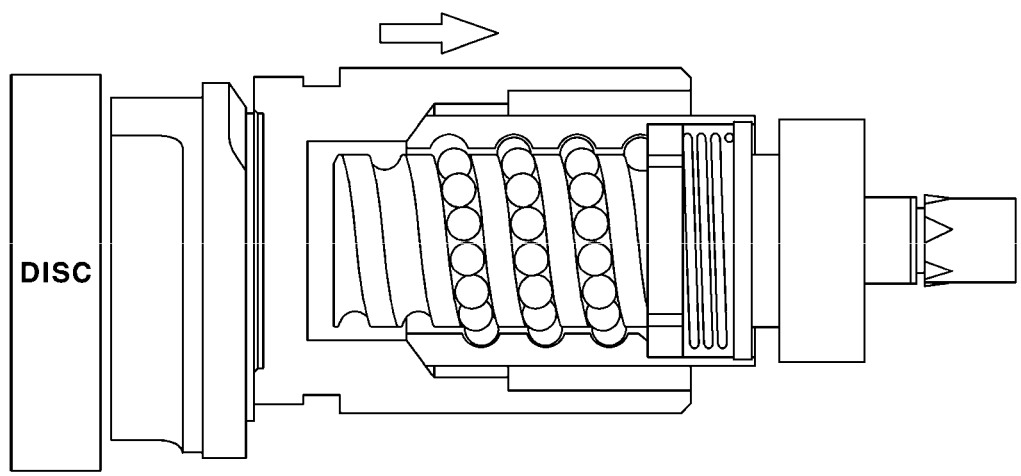

Then, when braking is ended, the nut member 131 and the piston 124 are moved backwards by the rotation of the screw. FIG. 5D illustrates a state after braking. In the present exemplary embodiment, the piston 124 and the nut advance by the abrasion amount of the friction pad by the restoring force of the spring member 135 after braking.

FIG. 7A, FIG. 7B, FIG. 7C, FIG. 7D, FIG. 7E, and FIG. 7F illustrate the details of the operation mechanism of the ball screw according to the present exemplary embodiment of the present invention.

First, FIG. 7A illustrates a state before contact with the ball retainer 133, illustrating the same state as FIG. 5A and FIG. 6A. The balls do not come in contact with each other, and have no sliding resistance therebetween.

Then, when braking pressurization is performed by the contact between the friction pad and the disk, a relative motion between the balls and the nut occurs while a frictional force is formed between the balls and the nut and a frictional force is also formed between the balls and the screw as illustrated in FIG. 7B. Then, as illustrated in FIG. 7C, the spring member 135 starts to be compressed while the gap between the balls and the ball retainer 133 disappears.

When braking is released, the frictional force of the balls is larger than the restoring force of the spring at the initial stage. Thus, as illustrated in FIG. 7D, the balls are moved, and a spring release occurs by the moving distance of the balls.

Figure 8A:
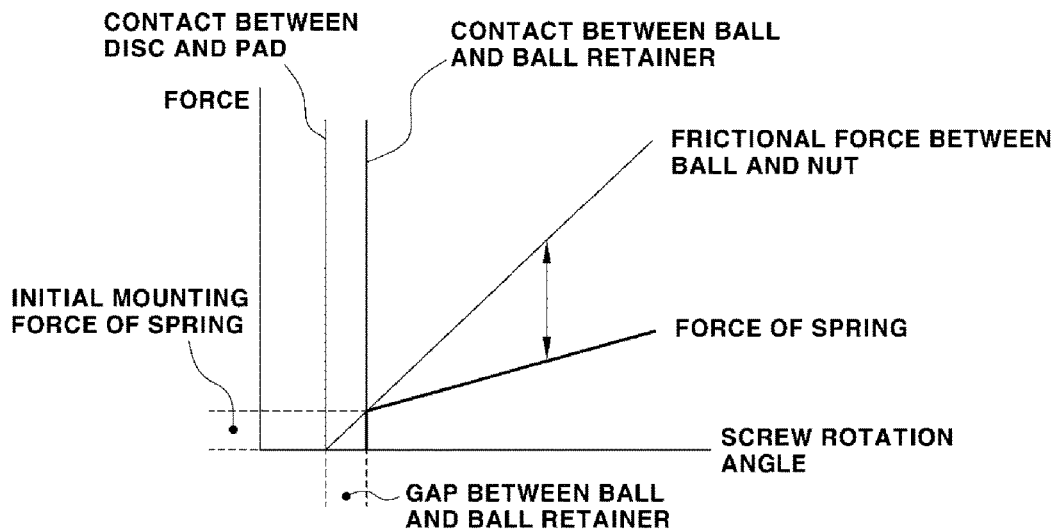
FIG. 8A illustrates a ball-nut frictional force and a force of a spring member before braking, according to a screw rotation angle.
Figure 8B:
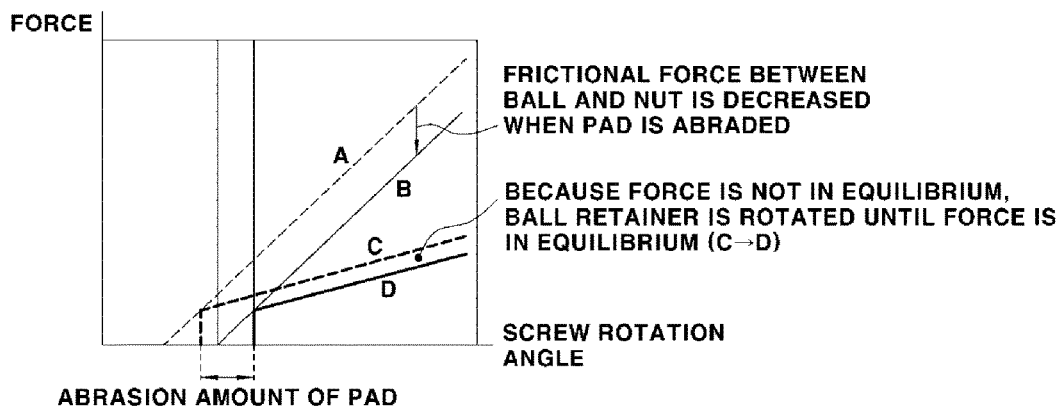
FIG. 8B illustrates that the ball-nut frictional force and the force of the spring member are changed in a state where the abrasion of the friction pad is generated.

On the other hand, when the friction pad is worn as illustrated in FIG. 8B, the frictional force between the balls and the nut is reduced. Thus, as braking release is performed, the frictional force of the balls becomes smaller than the restoring force of the spring. This state is illustrated in FIG. 7E. In the present state, since the restoring force of the spring is larger than the frictional force of the balls, the ball retainer 133 pushes the balls to compensate for abrasion, during the spring release. Therefore, in the present exemplary embodiment, the restoring force of the spring member 135 mounted on the ball retainer 133 can compensate for the abrasion amount of the friction pad.

In the present connection, FIG. 8A illustrates the ball-nut frictional force and the force of the spring member depending on the screw rotation angle before braking, and FIG. 8B illustrates that the ball frictional force and the force of the spring member are changed in a state where the wear of the friction pad occurred. FIG. 8A and FIG. 8B illustrate an example in which the initial mounting force is set in the spring member 135. In such an example, the nut member 131 can be additionally moved at a point of time that the support end portion 131c of the nut member 131 starts to restrict the movement of the ball retainer 133. The point of time indicates a state before the equilibrium of force is established, due to the initial mounting force, and may be set to a point at which a line D and a line B cross each other in FIG. 8B. Therefore, when braking is released, the balls are moved even after the ball retainer 133 is stopped. Thus, the gap between the balls and the ball retainer 133 can be maintained.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromechanical brake (EMB) comprising a piston configured for pressurizing a friction pad and a driving device configured to provide power for moving the piston, wherein the driving device comprises:
a nut member coupled to the piston and transferring an axial moving force to the piston;
a screw coupled to the nut member and rotated to move the nut member in an axial direction thereof;
balls including a rearmost ball and inserted between the nut member and the screw and transferring a rotational force of the screw to the nut member;
a compression coil spring having a first side mounted in a portion of the nut member; and
a ball retainer mounted at a second side of the compression coil spring, the second side being opposite to the first side of the compression coil spring,
wherein the ball retainer is disposed between the rearmost ball and the compression coil spring to be adjacent to the rearmost ball disposed at a rearmost end among the balls inserted between the nut member and the screw, and pressurizes the compression coil spring while coming in contact with the rearmost ball during braking pressurization.

2. The electro-mechanical brake of claim 1, wherein a head portion is formed at a first end portion of the nut member to pressurize an internal end portion of the piston, and a support groove is formed at a second end portion of the nut member to house the ball retainer and the compression coil spring.

3. The electro-mechanical brake of claim 2, wherein the support groove has a support end portion for restricting the ball retainer from moving toward the balls.

4. The electro-mechanical brake of claim 3, wherein the compression coil spring is fixedly mounted on the support end portion in a compressed state to have an initial mounting force.

5. The electro-mechanical brake of claim 1, wherein the ball retainer is disposed to have a gap with the ball before braking pressurization.

6. The electro-mechanical brake of claim 5, wherein the ball retainer forms a gap with the ball after braking is released.

7. The electro-mechanical brake of claim 1, wherein the ball retainer has a retainer groove formed in an internal surface thereof to house the balls.

8. The electro-mechanical brake of claim 1, wherein the ball retainer has one or more guide protrusions formed on an external circumferential surface thereof, and the nut member has an axial groove to guide an axial movement of the guide protrusions.

9. The electro-mechanical brake of claim 1, wherein the nut member has one or more guide protrusions formed on an internal surface thereof, and the ball retainer has an axial groove formed on an external circumferential surface thereof, wherein the axial groove guides the ball retainer in an axial direction along the guide protrusions.

10. The electro-mechanical brake of claim 1, wherein the ball retainer has a cylindrical shape to move in an axial direction along an internal surface of the nut member.

11. The electro-mechanical brake of claim 7, wherein the retainer groove has an inwardly curved surface or an inclined surface with a predetermined slope.

12. The electro-mechanical brake of claim 7, wherein the nut member has a guide groove through which the plurality of balls are configured to be moved, and
   the retainer groove has a same internal diameter as the guide groove.

* * * * *